(12) United States Patent  (10) Patent No.: US 7,091,722 B2
Homan et al.  (45) Date of Patent: Aug. 15, 2006

(54) METHOD AND APPARATUS FOR MEASURING MUD RESISTIVITY

(75) Inventors: Dean M. Homan, Sugar Land, TX (US); Dzevat Omeragic, Sugar Land, TX (US); Nicolas Sebline, Houston Land, TX (US); Hanming Wang, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 170 days.

(21) Appl. No.: 10/711,657

(22) Filed: Sep. 29, 2004

(65) Prior Publication Data

US 2006/0066313 A1 Mar. 30, 2006

(51) Int. Cl.
*G01V 3/28* (2006.01)
*G01V 3/08* (2006.01)
*G01V 3/10* (2006.01)

(52) U.S. Cl. .................. 324/339; 324/324; 324/346; 324/369

(58) Field of Classification Search .......... 324/324, 324/339, 346, 369
See application file for complete search history.

(56) References Cited

U.S. PATENT DOCUMENTS

| | | | |
|---|---|---|---|
| 4,651,101 A | 3/1987 | Barber et al. | |
| 4,873,488 A | 10/1989 | Barber et al. | |
| 5,041,975 A | 8/1991 | Minerbo et al. | |
| 5,157,605 A | 10/1992 | Chandler et al. | |
| 5,168,234 A | 12/1992 | Freedman | |
| 5,574,371 A | 11/1996 | Tabanou et al. | |
| 6,297,639 B1 | 10/2001 | Clark et al. | |
| 6,556,016 B1 | 4/2003 | Gao et al. | |
| 6,584,408 B1 | 6/2003 | Omeragic | |
| 6,690,170 B1 | 2/2004 | Homan et al. | |
| 6,937,022 B1* | 8/2005 | Itskovich et al. | 324/339 |
| 2003/0028324 A1 | 2/2003 | Xiao et al. | |
| 2003/0085707 A1 | 5/2003 | Minerbo et al. | |
| 2003/0184304 A1 | 10/2003 | Homan et al. | |
| 2003/0200029 A1 | 10/2003 | Omeragic et al. | |
| 2004/0056816 A1 | 3/2004 | Bittar et al. | |
| 2005/0140374 A1 | 6/2005 | Itskovich | |
| 2005/0167100 A1 | 8/2005 | Itskovich | |
| 2005/0212520 A1 | 9/2005 | Homan et al. | |

* cited by examiner

*Primary Examiner*—Bot LeDynh
(74) *Attorney, Agent, or Firm*—Kevin P. McEnaney; Bryan L. White; Victor H. Segura

(57) ABSTRACT

A sensor for measuring mud resistivity in a borehole includes a transmitter having a magnetic moment in a first direction; and a receiver having a magnetic moment in a second direction, wherein the first direction and the second direction are substantially different, wherein the transmitter and the receiver are disposed in an insulating collar of a downhole tool, and wherein the transmitter is disposed at a selected distance no more than 10 inches from the receiver along a longitudinal axis of the downhole tool.

29 Claims, 12 Drawing Sheets

METHOD AND APPARATUS FOR MEASURING MUD RESISTIVITY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to resistivity logging of formations penetrated by a wellbore. More particularly, the invention relates to sensors that can be used to determine resistivity of mud in the wellbore.

2. Background Art

Oil and gas exploration requires a vast amount of information about the properties of the formations. Among various logging techniques, resistivity logging can provide useful information to locate hydrocarbon reservoirs. Various resistivity logging tools, including induction logging tools, are known in the art. One example of an induction logging tool may be found in U.S. Pat. No. 5,157,605 issued to Chandler et al. Various factors in the borehole may affect the accuracy of induction measurements. U.S. Pat. No. 5,041,975 issued to Minerbo et al. discloses a wellbore correction system for improving the accuracy of measurements made by induction logging apparatus. The correction system disclosed in Minerbo et al. corrects for errors arising from borehole effects, which may include effects due to currents flowing in the mud in the borehole, irregular shapes of boreholes, or tool eccentering. To correct for these borehole effects, it is often necessary to know the resistivity (or conductivity) of the mud in the wellbore. The mud conductivity often needs to be known with good accuracy because the mud conductivity may be orders of magnitude larger than the formation conductivity, and, therefore, errors of a few percent in mud conductivity may have a major impact on the accuracy of the determined formation conductivity.

To determine mud conductivities, various sensors have been used in the art, including an Auxiliary Measurement Sub (AMS sub). The AMS sub is typically located above an induction well logging apparatus and provides measurements of mud resistivity in the wellbore in addition to other measurements, such as temperature measurements and tool acceleration measurements. However, the AMS sub does not always provide accurate mud resistivity, due to potential influence of the formation resistivity.

U.S. Pat. No. 5,574,371 issued to Tabanou et al. discloses an improved mud sensor. This sensor is disposed on a probe that is connected to the bottom of a tool string. This sensor "looks" down instead of sideways to minimize the influence of the formation resistivity. This patent is assigned to the assignee of the present invention and is incorporated by reference in its entirety.

FIG. 1 shows a well logging apparatus including a mud sensor, such as those disclosed in the Tabanou et al. patent. As shown, a well logging apparatus 24 is disposed in wellbore 12. The well logging apparatus 24 may be any induction well logging apparatus, which may be a wireline tool or a logging-while-drill (LWD) tool. A mud resistivity sensor 26 is connected to the bottom 24a of the well logging apparatus 24. The sensor 26 is adapted to measure the resistivity, $R_m$, of the mud 18 below the sensor 26 in the wellbore 12.

FIG. 2 shows a detailed structure of sensor 26 of FIG. 1, as disclosed in the Tabanou et al. patent. As shown, the sensor 26 includes a current injector electrode ($A_0$) 37 for emitting a current $I_0$ into the mud 18, a current return electrode 34, which may be the conductive part of a downhole sub, for receiving the current $I_0$ from the mud, and a pair of measurement electrodes ($M_1$, $M_2$) 36 for measuring the voltage drop between them. When a current $I_0$ is emitted from the current injector electrode ($A_0$) 37 and returned to the current return electrode 34, such current $I_0$ propagates in the mud 18 in a direction approximately parallel to the longitudinal axis 24b of the well logging apparatus 24, when the current $I_0$ passes in front of the measurement electrodes ($M_1$, $M_2$) 36. This provides measurements that are less influenced by the formation conductivity.

These prior art mud sensors use galvanic electrodes, which need to be in contact with the mud. These electrodes are exposed on the tool body and are typically insulated from the conductive tool body by insulating materials. The insulating material electrically isolates these electrodes from the conductive parts of the tool and also protects the electronics inside the tool from the harsh environment downhole. However, with the borehole being drilled deeper and deeper, the temperatures and pressures encountered by these tools increase accordingly, making it difficult for the insulating material to maintain good seal against the high pressures (up to 20,000 psi) and high temperatures downhole.

Therefore, there exists a need for better mud sensors and methods for mud resistivity measurements.

SUMMARY OF INVENTION

One aspect of the invention relates to a sensor for measuring mud resistivity in a borehole. A sensor in accordance with one embodiment of the invention includes a transmitter having a magnetic moment in a first direction; and a receiver having a magnetic moment in a second direction, wherein the first direction and the second direction are substantially different, wherein the transmitter and the receiver are disposed in an insulating collar of a downhole tool, and wherein the transmitter is disposed at a selected distance no more than 10 inches (preferably no more than 2 inches) from the receiver along a longitudinal axis of the downhole tool.

Another sensor in accordance with one embodiment of the invention includes a transmitter having a magnetic moment in a first direction; and a receiver having a magnetic moment in a second direction, wherein the first direction and the second direction are substantially different, wherein the transmitter and the receiver are disposed in an insulating collar of a downhole tool, and wherein the transmitter and the receiver are disposed on a plane substantially perpendicular to a longitudinal axis of the downhole tool and separated from each other by an angular separation of less than 90 degrees.

One aspect of the invention relates to a method for measuring mud resistivity in a wellbore. A method in accordance with one embodiment of the invention includes energizing a transmitter to induce a magnetic field, wherein the transmitter has a magnetic moment in a first direction; acquiring a voltage measurement using a receiver at a selected location, wherein the receiver has a magnetic moment in a second direction that is substantially different from the first direction, and wherein the selected location is no more than 10 inches (preferably no more than 2 inches)

away from the transmitter; and deriving a mud conductivity from the voltage measurement.

Other aspects and advantages of the invention will be apparent from the following description and the appended claims.

DETAILED DESCRIPTION

Figure 1:
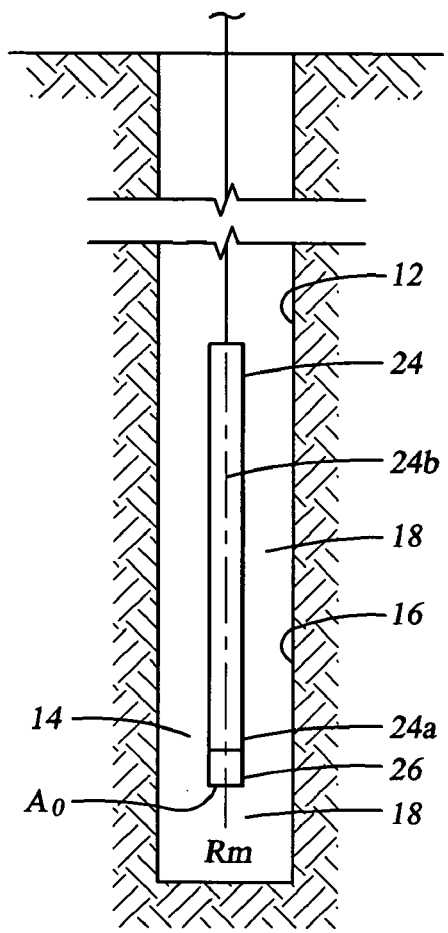
FIG. 1 shows a prior art logging-while-drilling system.
Figure 2:
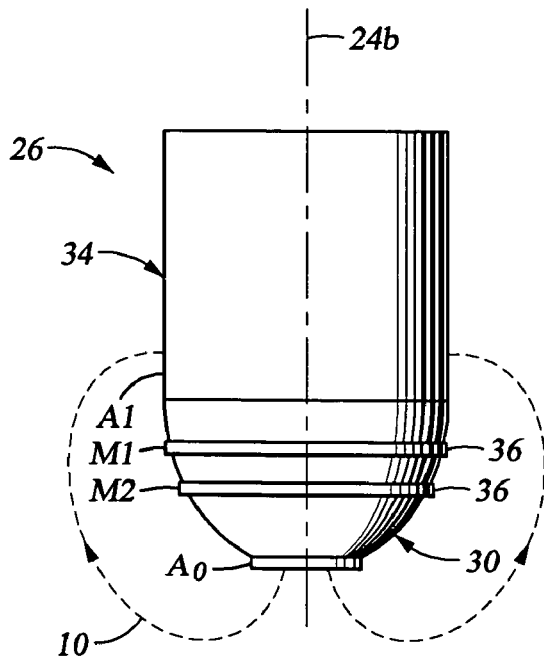
FIG. 2 shows a prior art mud sensor.

Embodiments of the invention relate to apparatus and methods for mud resistivity (or conductivity) measurements. A mud sensor in accordance with embodiments of the invention need not be placed at the end of a drill string and, therefore, may be used in a pass-through configuration. Furthermore, embodiments of the invention can provide accurate mud resistivity measurements with less influence from the borehole, tool eccentering (standoff), and formation resistivity.

In the following description, for clarity of illustration, the terms "transmitter" and "receiver" are used as if they are different types of coils. However, one of ordinary skill in the art would appreciate that a transmitter and a receiver have identical physical properties and can be switched electronically to reverse their roles (i.e., principle of reciprocity) to obtain symmetric measurements. Therefore, specific references to a transmitter or a receiver in this description should not limit embodiments of the invention to the particular configuration. In addition, one of ordinary skill in the at would appreciate that any reference to resistivity may be replaced with its inverse, conductivity.

Embodiments of the invention are based on induction antennas, instead of galvanic electrodes. A typical induction antenna comprises coils, such as solenoid antennas or loop antennas. In some embodiments, the coils may be wrapped around a core, such as ferrite. Such an antenna (transmitter) when energized with an alternate current generates a magnetic field, the magnetic moment of which is aligned with the axis of the coils. The magnetic field induces eddy currents in the vicinity of the antenna. The induced eddy currents flow in loops in planes perpendicular to the direction of the magnetic moment. The eddy currents can induce a voltage in another antenna (receiver) located nearby.

The magnitude of the signal (voltage) induced in the receiver depends on the orientation of the magnetic moment of the antenna. In a homogeneous medium, if the direction of the magnetic moment of the receiver is aligned with the axis of the eddy current loops (hence, aligned with the direction of the magnetic moment of the transmitter), the induction is most efficient. When the direction of the magnetic moment of the receiver is orthogonal to the axis of the eddy current loops (hence orthogonal to the direction of the magnetic moment of the transmitter), the induction efficiency is at a minimum. Therefore, a conventional induction array typically includes a transmitter antenna and a receiver antenna that are typically aligned in the same direction.

As noted above, mud resistivity measurements are often complicated by signals arising from formation resistivities and by errors arising from borehole effects, which may be due to different sizes/shapes of the borehole or tool eccentering. To design a mud resistivity sensor that is less affected by the formation resistivity and borehole effects, various configurations of induction arrays have been examined by modeling with a 3D cylindrical electromagnetic (EM) field simulator.

Figure 3:
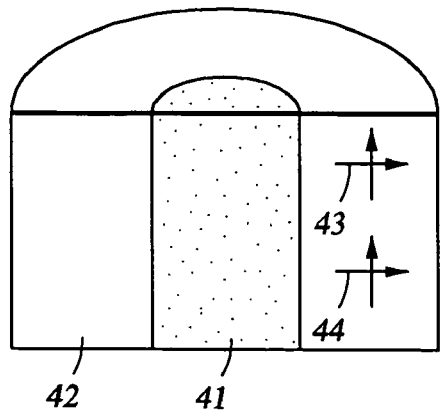
FIG. 3 shows a mud sensor in accordance with one embodiment of the invention.

The modeling was performed with a tool configuration shown in FIG. 3. As shown, the tool has a conductive mandrel 41 having a radius of about 0.8 inch and an insulating collar 42 circumscribing the mandrel 41. The insulating collar 42 has a radius of about 1.5 inch. The transmitter antenna 43 and the receiver antenna 44 are disposed in the insulating collar of the tool at a radial distance of 1.15 inch from the center of the tool. Note that the particular dimensions illustrate one example of a sensor and are not intended to limit the present invention. The transmitter 43 and the receiver 44 form an array (or an induction array). The array may further include a bucking antenna (not shown), which functions to eliminate or reduce the mutual coupling between the transmitter and the receiver.

In this particular embodiment, the transmitter 43 is shown as an antenna having a magnetic moment that is aligned with (LMD) or perpendicular to (TMD) the longitudinal axis of the tool. The receiver 44 is likewise shown to have a magnetic moment in a direction substantially parallel (LMD) or perpendicular (TMD) to the longitudinal axis of the tool. Each LMD or TMD transmitter may be paired with an LMD or a TMD receiver. Thus, four arrays are possible with this particular setup (see FIG. 4).

Figure 4:
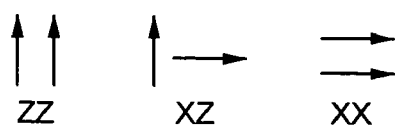
FIG. 4 shows three representative arrangements of transmitter and receiver antennas in accordance with embodiments of the invention.

FIG. 4 shows three different couplings between a transmitter and a receiver. The zz coupling has both the transmitter and the receiver aligned in the z direction (LMD). The xx coupling has both the transmitter and the receiver aligned in the x direction (TMD). The xz coupling has the transmitter in the x direction (LMD) and the receiver in the z direction (TMD). Note that the zx coupling (not shown) is symmetric to the xz coupling and will have similar properties. The xz or zx coupling, as shown in FIG. 4, is a "cross-dipole" coupling, in which the magnetic dipoles of the transmitter and the receiver are substantially orthogonal to each other. As used in this description, "cross dipole" refers to the magnetic dipoles (or moments) of the transmitter and the receiver oriented in substantially different directions, i.e., forming an angle that is substantially greater than 0°, preferably between 45° and 90°, and more preferably around 90°. See U.S. Pat. No. 6,584,408 issued to Omeragic, U.S. patent application Ser. Nos. 2003/0085707 A1 by Minerbo et al., and 2003/0200029 by Omeragic et al.

Figure 5:
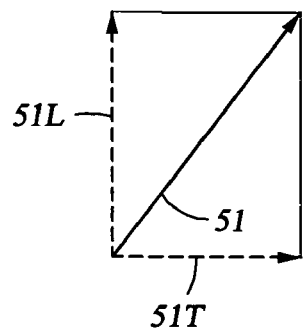
FIG. 5 shows a diagram illustrating the magnetic moment of a tilted antenna.

Cross-dipole arrays are determined by the angle between the directions of the magnetic moments of the transmitter and the receiver. In some embodiments, either the transmitter or the receiver may be parallel to or perpendicular to the longitudinal axis of the tool. In some embodiments, the transmitter or receiver antenna may comprise a tilted antenna, the magnetic moment of which is neither aligned with nor perpendicular to the longitudinal axis of the tool. As shown in FIG. 5, a tilted antenna 51 may be considered as having two components 51L and 51T in its magnetic moment; component 51L is aligned with the longitudinal axis of the tool and component 51T is perpendicular (transverse) to the longitudinal axis of the tool. These two components may be decomposed (separated) during data analysis. Accordingly, a mud sensor in accordance with embodiments of the invention may comprise an array comprising a TMD, LMD, or tilted antenna.

In the simulation, the tool shown in FIG. 3 is disposed in a borehole (not shown) having a selected radius (e.g., 4, 5, or 8 inches). Various parameters are modeled to better understand the properties of the mud sensor. These parameters include the array spacing L between the transmitter 43 and the receiver 44, the relative orientations of the transmitter 43 and the receiver 44 antennas (e.g., zz, xz, and xx), mud and the effect of tool rotation. The modeling also looks at the effects of borehole sizes, tool eccentering, formation conductivity, and the mud conductivity.

First, the effects of various array spacings L are examined. One of ordinary skill in the art would appreciate that the array spacing L affects the vertical resolution of the tool and how far the tool "reads" into the surrounding (depth of investigation, DOI), with a longer spacing having a lower vertical resolution and a larger DOI. The modeling shows that a shorter spacing provides a more accurate measurement of mud resistivity, presumably due to its near "reading" (hence, less influence from the formation resistivity). For example, among the 1, 1.6, and 2.2 inch spacings, the array having the 1 inch spacing provides a mud conductivity reading that is closest to the reference mud conductivity.

Because the magnetic moments of the antennas are directional, the relative orientations of the transmitter and receiver antennas have a major impact on the detectable signal magnitudes. The effects of various orientations of the transmitter and/or the receiver are modeled to determine the best configuration for a mud sensor. FIG. 4 shows three representative arrangements of induction arrays: xx, zz, and xz, in which the magnetic moment of the transmitter or the receiver is aligned with or perpendicular to the tool axis. Note that a transmitter or a receiver may also be oriented in a direction that is not parallel or perpendicular to the tool axis (i.e., a tilted antenna). Therefore, the three configurations shown are for illustration only.

Figure 6:
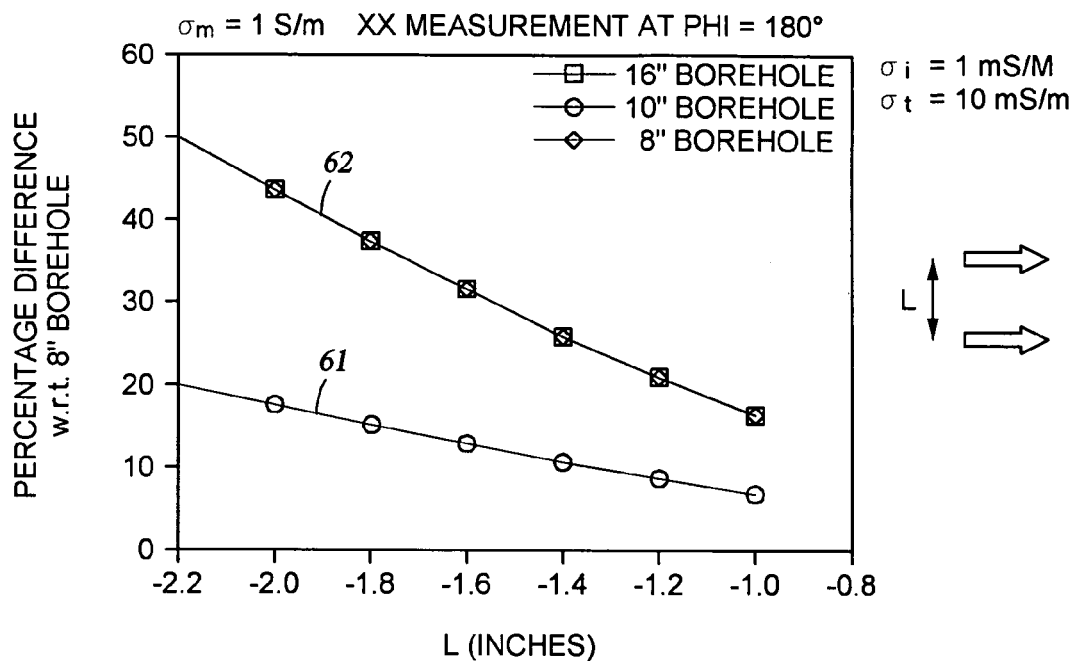
FIG. 6 shows borehole size effects on a mud sensor having an xx coupling.

As shown in FIG. 6, the xx coupling is very sensitive to borehole size changes. The simulation was performed with 1 mS/m conductivity in the insulating collar, 1000 mS/m conductivity in the mud that filled the borehole, and 10 mS/m conductivity in the formation. As shown, curve 61 shows the signal magnitude changes for a 10" borehole relative to an 8" borehole, while curve 62 shows the signal magnitude changes for a 16" borehole relative to an 8" borehole. The graph also shows these changes as a function of the array spacing L. It is clear that the larger the array spacing L, the more sensitive the sensor is to the borehole size changes. Up to 10% change, depending on the array spacing L, in the magnitude of the received signal is observed when the borehole size changes from 8" to 10". Up to 20% change, depending on the array spacing L, in the magnitude of the received signal is observed if the borehole size changes from 8" to 16". The percent changes in the magnitude of the received signals are defined as follows:

$$\% \text{ difference} = (\sigma_{apparent} - \sigma_{mud})/\sigma_{mud} \times 100\%,$$

where $\sigma_{apparent}$ is the apparent mud conductivity derived from the mud sensor measurement and $\sigma_{mud}$ is the reference mud conductivity. These results show that the xx coupling is very sensitive to the borehole size changes, suggesting that this configuration is significantly influenced by formation conductivity and, therefore, would not be an ideal mud sensor.

Figure 7:
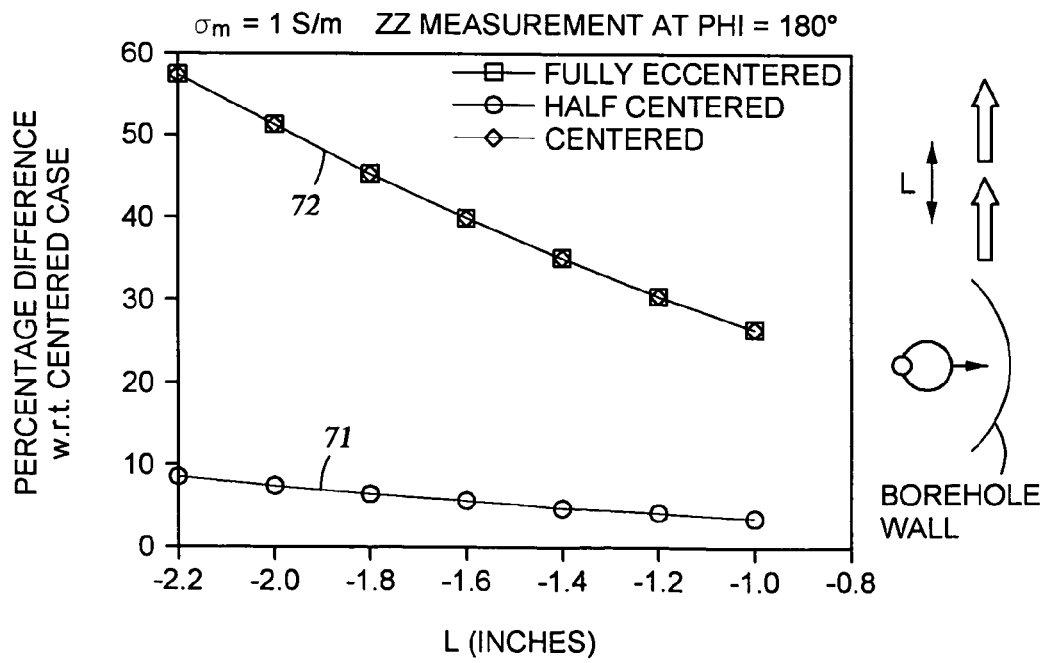
FIG. 7 shows tool eccentering effects on a mud sensor having a zz coupling.

Although the zz coupling is not as sensitive as the xx coupling to the borehole size changes, it is relatively sensitive to tool eccentering. FIG. 7 shows results of a simulation using the same tool parameters and same mud and formation conductivities as those in FIG. 6. The graph is shown as percent differences of the receiver signals as a function of arrays spacing L for a tool half-eccentered (curve 71) and fully-eccentered (curve 72) in a 4 inch radius borehole. The eccentering is measured by a distance between the outside diameter of the tool and the borehole wall. Full eccentering occurs when the tool contacts the borehole wall. The sensor is positioned on the tool away ($\phi$=180°) from the side of the tool that contacts the borehole wall. As shown in FIG. 7, up to 9% change, depending on the array spacing L, in the magnitude of the received signal is observed when the sensor is moved from a centered position to a half-eccentered position, and up to 28% change, depending on the array spacing L, is observed when the sensor is moved from a centered position to a fully eccentered position. These results indicate that the zz configuration cannot always provide an accurate reading of mud resistivity.

Figure 8:
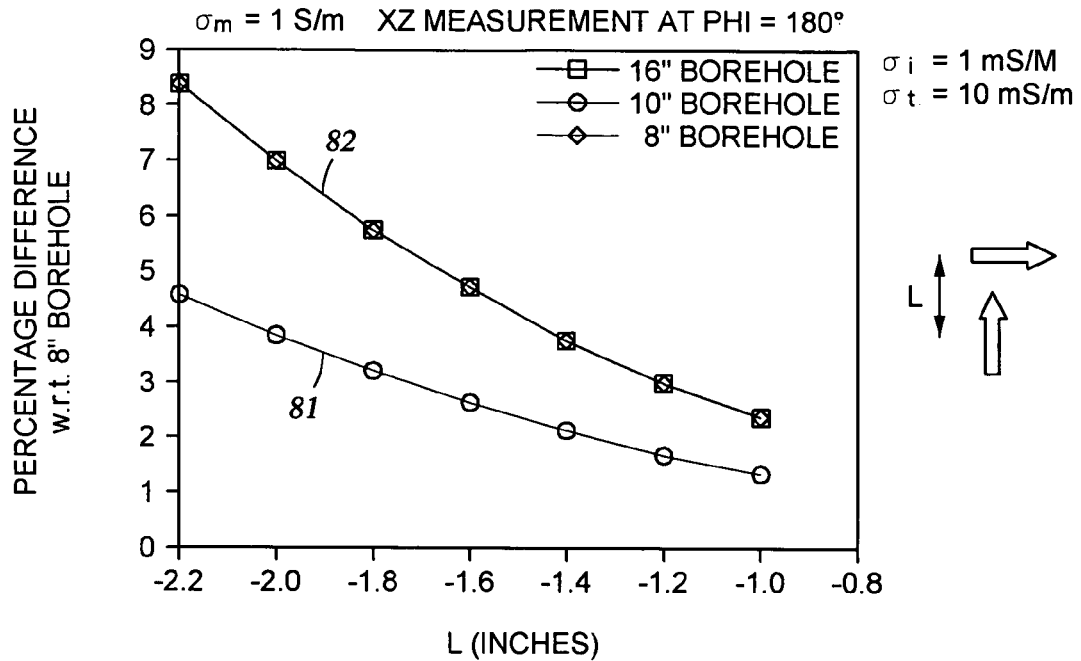
FIG. 8 shows borehole size effects on a mud sensor having an xz coupling.

Surprisingly, the cross dipole configuration, i.e., xz (or zx, zy, yz) coupling, is relatively insensitive to changes in either the borehole size or tool eccentering. FIG. 8 shows the effects of borehole size changes on the xz coupling. As shown, a borehole size change from 8 inches to 10 inches only produces up to 1.5% change, depending on the array spacing L, in the magnitude of the received signal, and a borehole size change from 8 inches to 16 inches only produces up to 2.5% change. These changes are significantly smaller than those observed with zz or xx coupling. Note that standard induction type tools are run with standoffs. Therefore, the mud sensor will be at an inch or more off the borehole wall most times. The fact that the cross dipole couplings are relatively insensitive to the distance between the sensor and the borehole wall ensures that measurements will be accurate regardless of tool standoffs.

Figure 9:
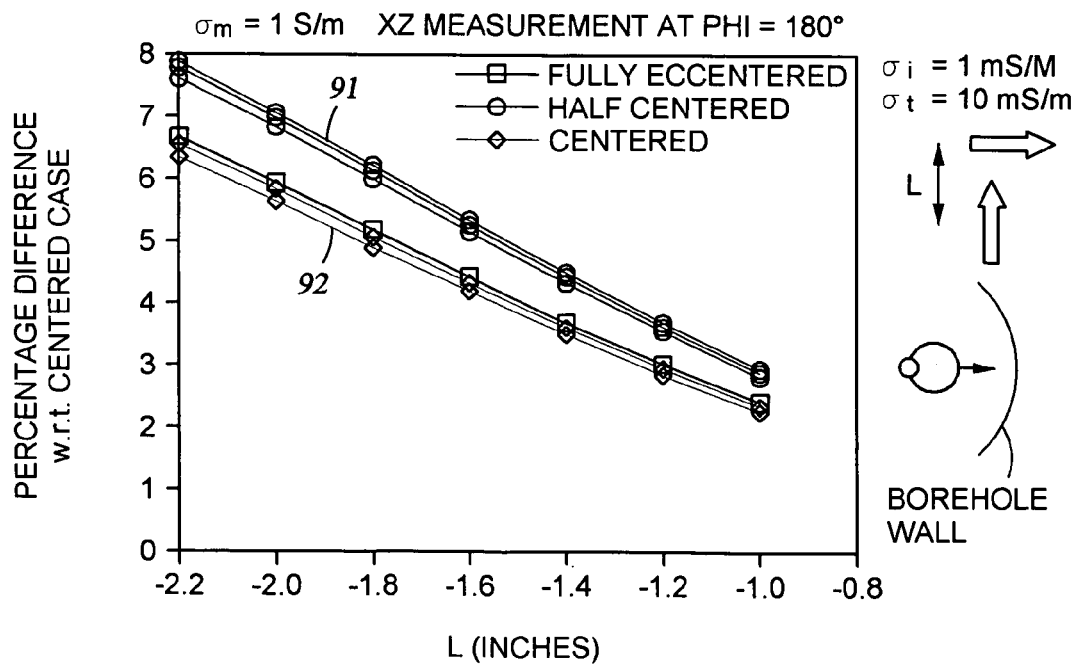
FIG. 9 shows tool eccentering effects on a mud sensor having an xz coupling.

FIG. 9 shows the effects of tool eccentering on the xz coupling as a function of array spacing L. As shown, going from a centered position to a fully eccentered position (curve 92) only produces a 2.5% change in the magnitude of the received signal, when the array spacing is 1 inch. Interestingly, the half-eccentering (curve 91) seems to be more sensitive to tool standoff. This may be due to the particular dimensions used in this simulation. In any event, the difference between curves 91 and 92 is not large and, therefore, may not be significant. More importantly, both curves 91 and 92 show much reduced sensitivity to tool eccentering, as compared to those shown in FIG. 7 for the zz coupling.

The reduced sensitivity to borehole size and to tool eccentering indicate that the xz cross dipole configuration can produce more robust and accurate measurements of mud conductivity. Thus, various environmental factors that might impact the accuracy of the mud conductivity measurement using a cross dipole sensor was further investigated.

Figure 10:
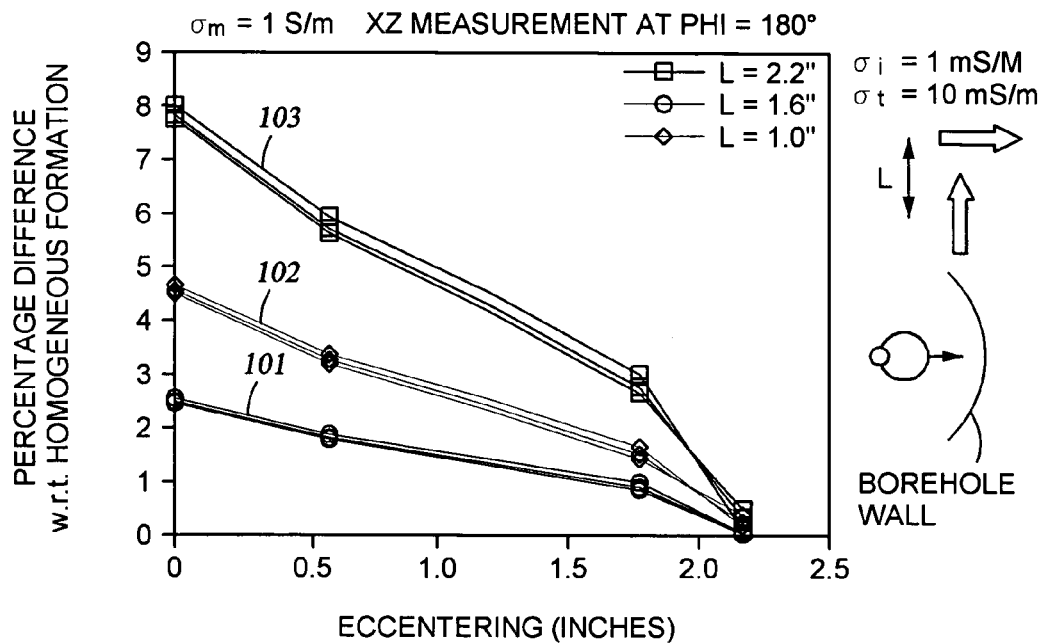
FIG. 10 shows tool eccentering and array spacing effects on a mud sensor having an xz coupling.
Figure 11:
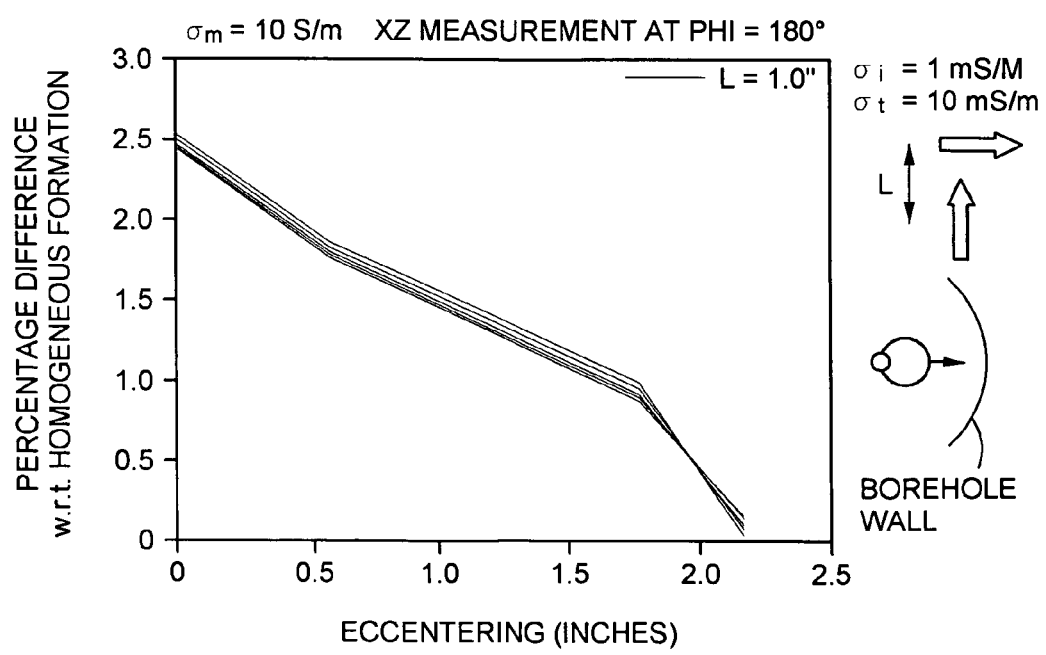
FIG. 11 shows tool eccentering effects on a mud sensor having an xz coupling.

FIG. 10 shows that the cross dipole array xz having a 1" spacing (curve 101) is not very sensitive to tool eccentering, no more than 2.5% for all eccenterings. In comparison, the 1.6" spacing (curve 102) and the 2.2" spacing (curve 103) arrays are more susceptible to tool eccentering, with 4.6% and 8.0% maximal differences, respectively. As noted above, these changes are all substantially lower than that for the zz coupling shown in FIG. 7. These characteristics of the xz cross dipole suggest that it is not significantly affected by the tool eccentering, i.e., this sensor is robust and is minimally affected by tool eccentering. Such tool eccentering "immunity" is unlikely to be dependent on the formation conductivity and/or mud conductivity. Indeed, as shown in FIG. 11, the 1" spacing array has essentially the same dependence on tool eccentering in a mud having a conductivity of 10 mS/m, as compared with that in FIG. 10, which has a mud conductivity of 1 mS/m.

A mud sensor in accordance with the invention may be used on a logging-while-drilling (LWD), measurement-while-drilling (MWD), or logging-while-tripping (LWT) tools. In this description, LWD will be used generally to include LWD, MWD and LWT, because the difference between these tools are not germane to the embodiments of the invention. When used on an LWD tool, the mud sensor rotates with the drill string, and, therefore, the azimuthal angles of the sensor change with time. Accordingly, the effect of tool rotation was modeled next.

Figure 12:
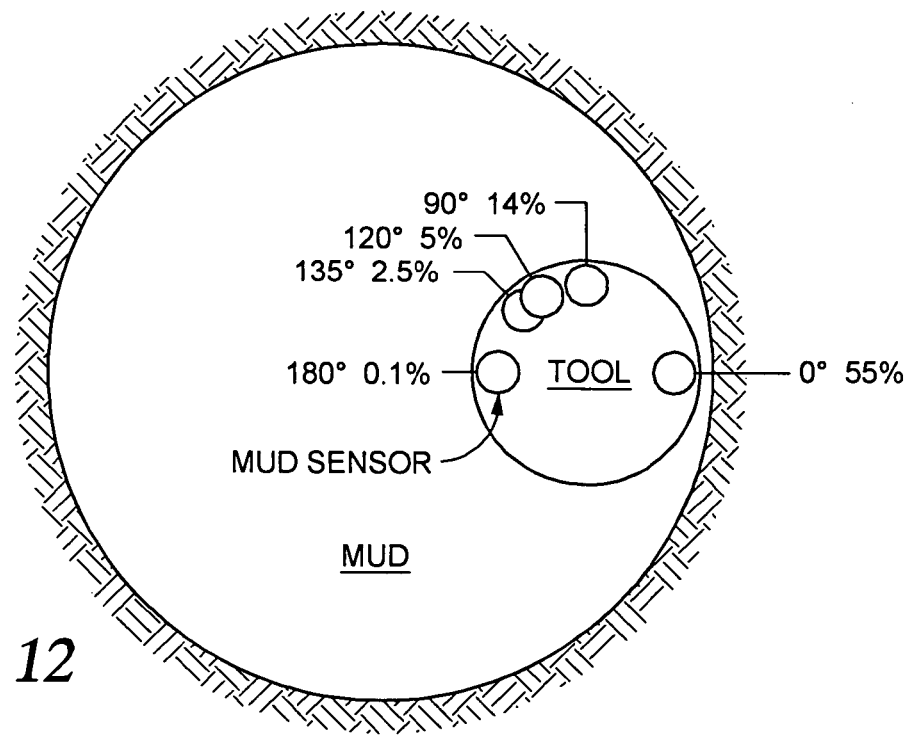
FIG. 12 shows tool rotation effects on a mud sensor having an xz coupling.

As shown in FIG. 12, the difference between the apparent and true mud conductivities are highly dependent on the angular locations of the mud sensor. It is clear from FIG. 12 that the difference is minimal (0.1% difference) when the sensor is at 180°, where it sees most mud and is less influenced by the formation resistivity. At 135°, the difference is 2.5%, which may be tolerable in most applications. Therefore, if the mud sensor is located between 135° and 225°, the mud sensor is not significantly affected by tool eccentering. Accordingly, if 4 or more sensors are provided around the periphery of the tool, at least one of the sensors will be in this angular range at all times to provide accurate mud resistivity measurements.

Figure 13:
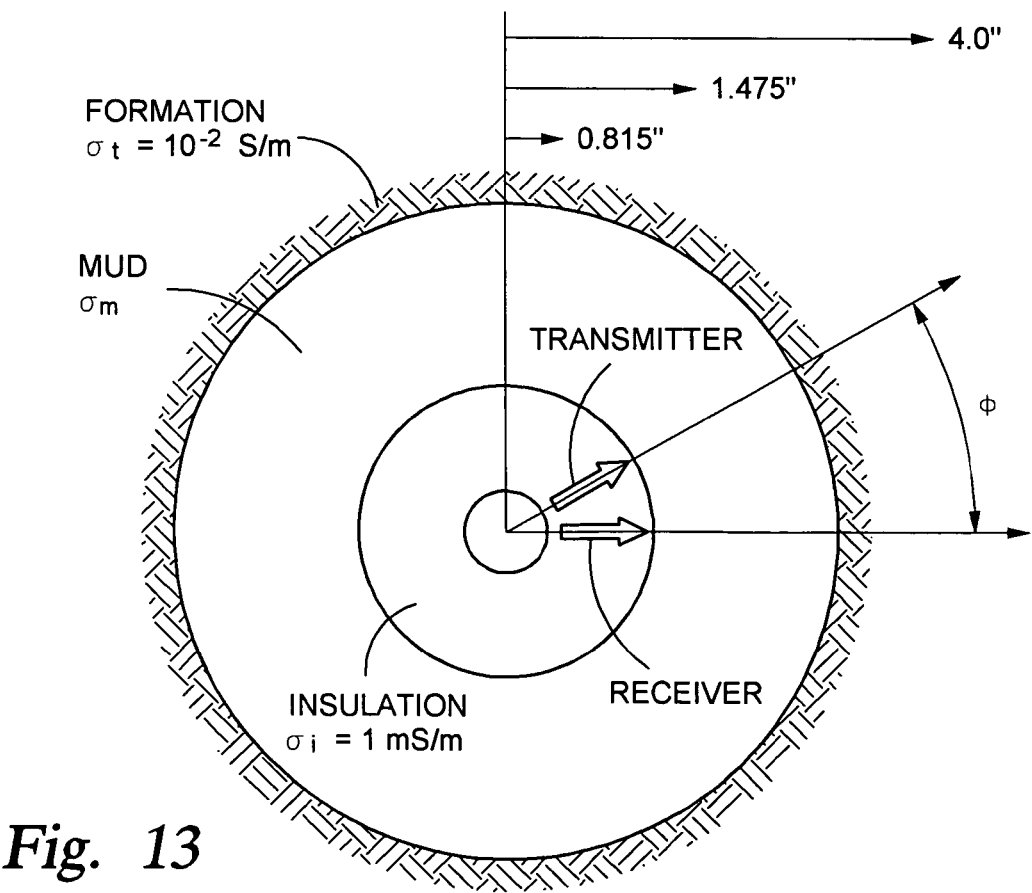
FIG. 13 shows an alternate configuration of a mud sensor having the transmitter and the receiver antenna on a plane perpendicular to the tool axis and separated by an angle $\phi$.

The above results show that shorter array spacings L produce more accurate results. Because the above array spacings are along the z direction (tool axis), it therefore is interesting to see whether elimination of spacing along the z direction will produce a better sensor. will produce a robust sensor. FIG. 13 shows an alternate configuration, in which both the transmitter and the receiver are disposed on the same plane perpendicular to the tool axis (i.e., same vertical plane). In this configuration, the transmitter and the receiver are separated by their different angular locations. For example, as shown in FIG. 13, the transmitter and the receiver are disposed with an "angular separation" of $\phi$ degrees. The "angular separation" as used herein refers to the angle formed between the lines leading from the center of the tool to the transmitter and the receiver. Each of the transmitter and receiver antennas may be oriented, for example, along or perpendicular to the tool axis to produce an xx, xz, or zz coupling.

Figure 14:
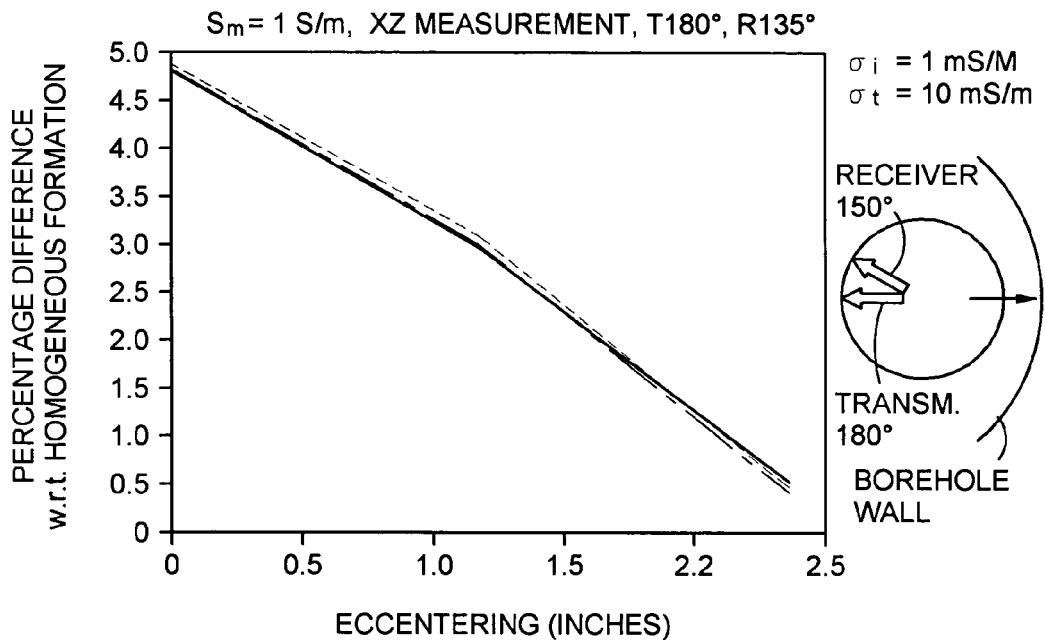
FIG. 14 shows tool eccentering effects on a mud sensor shown in FIG. 13 having $\phi=30°$.
Figure 15:
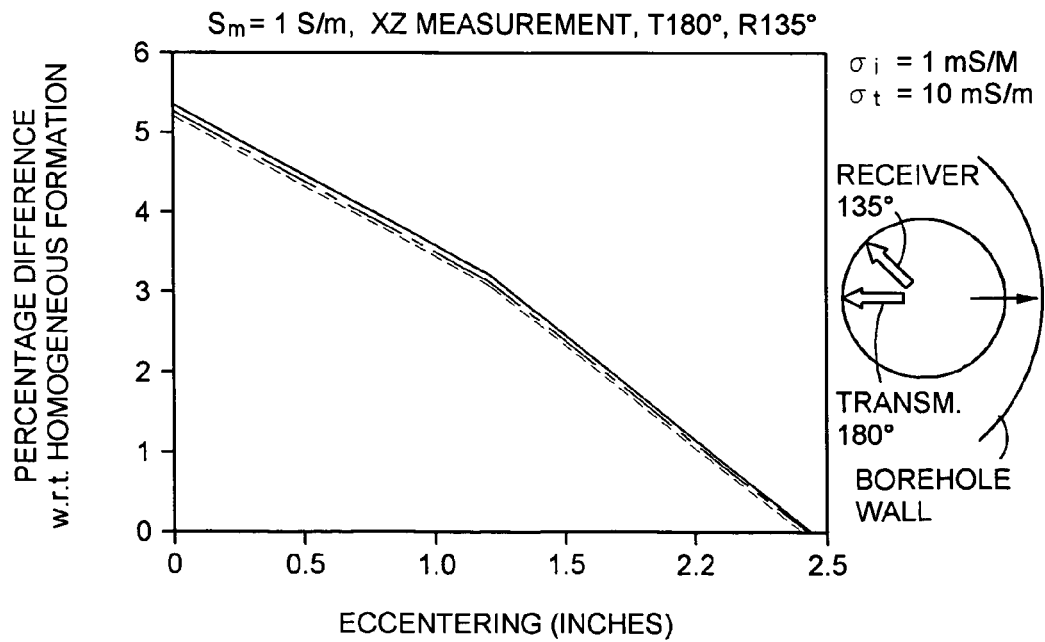
FIG. 15 shows tool eccentering effects on a mud sensor shown in FIG. 13 having $\phi=45°$.

The behavior of a mud sensor shown in FIG. 13 was modeled with the same tool and borehole parameters as described above. It was found that the xz cross dipole coupling also produces more accurate measurements than the xx or zz coupling. However, results produced by the xz cross dipole coupling in this alternate configuration are less accurate than those produced a cross dipole xz sensor having an array spacing L along the tool axis (see FIG. 3). For example, FIGS. 14 and 15 show results from tools with a 35° and a 45° azimuthal angle separations, respectively, between the transmitter and the receiver. The azimuthal angle is the angle ($\phi$ in FIG. 13) subtended by the transmitter and the receiver with respect to the axis of the tool. Tool eccentering produces differences up to 4.8% and 5.3% for the 35° and a 45° azimuthal angle separations, respectively. Although these results are worse than that of the xz cross dipole sensor of FIG. 3, they may still be within an acceptable range depending on particular applications. These results also suggest that a smaller azimuthal angle separation between the transmitter and the receiver produces more accurate measurements. Thus, this sensor configuration may still be useful in some applications. Note that the configuration in FIG. 13 shows both the transmitter and the receiver on the same plane perpendicular to the axis of the tool. This is for illustration only. One of ordinary skill in the art would appreciate that embodiments of the invention may include configurations in which the transmitter and the receiver are on different planes perpendicular to the tool axis (i.e., with axial spacing) and include an azimuthal angle separation, i.e., a hybrid of that shown in FIG. 3 and that shown in FIG. 13.

The above results show that the cross dipole xz coupling shown in FIG. 3 provides the best mud sensor configuration. Various factors that are known to affect resistivity measurements are now modeled using this sensor configuration.

Referring to FIG. 3 again, the transmitter and the receiver (the induction array) are located in the insulating collar of the logging tool. This induction array is similar to that found in a conventional resistivity logging tool, such as the AIT-H™ tool sold by Schlumberger Technologies Corp. (Houston, Tex.). It is known that the conductive parts (e.g., wires, connectors, solder, and the conductive mandrel) of such a logging tool can give rise to sonde errors, which are signals produced by the tool in a nonconductive environment (e.g., air). Sonde errors may be determined beforehand and then subtracted from the tool measurements to remove their impact on the conductivity determination.

Figure 16:
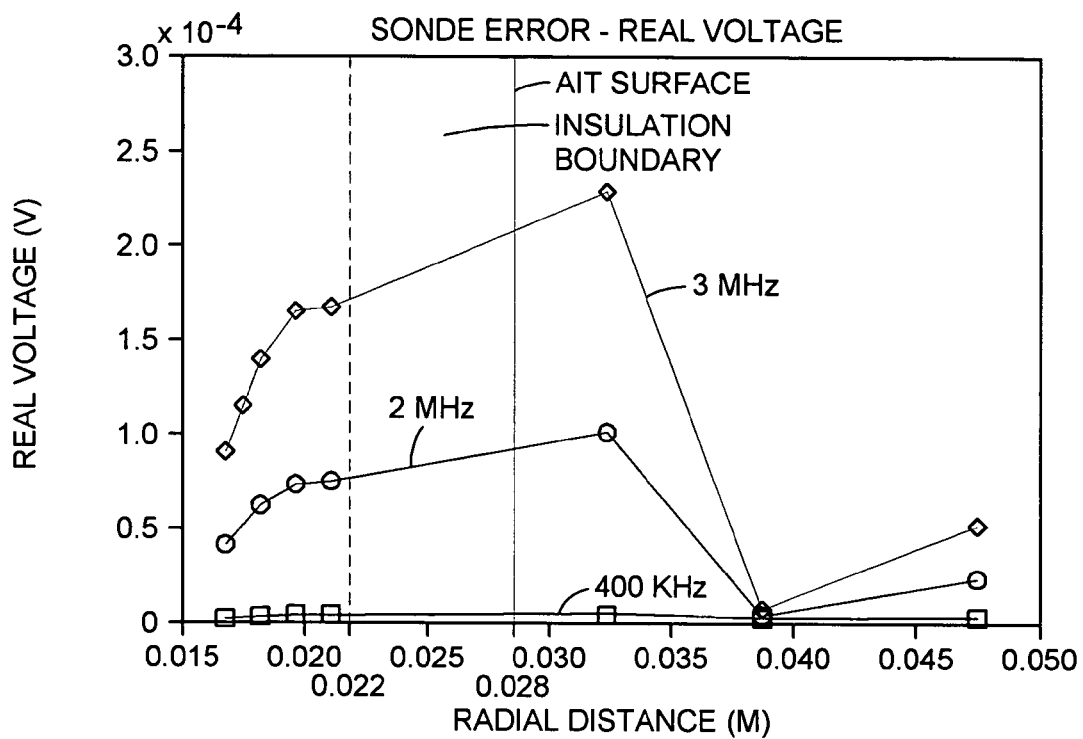
FIG. 16 shows real signals as a function of radial distance of the array location of a sensor shown in FIG. 3.
Figure 17:
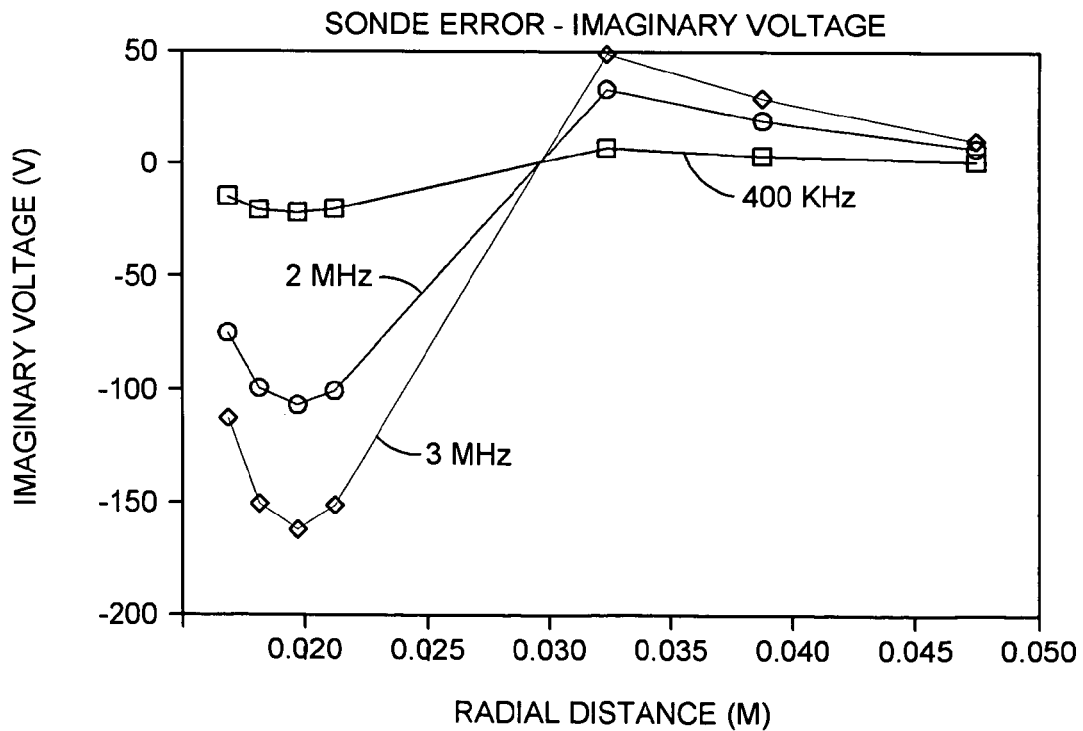
FIG. 17 shows imaginary signals as a function of radial distance of the array location of a sensor shown in FIG. 3.

FIGS. 16 and 17 illustrate the sonde errors of an xz cross dipole mud sensor of FIG. 3 as a function of the radial location of the induction array. As shown, the magnitudes of both the real (FIG. 16) and the imaginary (FIG. 17) signals detected by the receiver are dependent on the radial locations of the induction array, i.e., the magnitudes of the signals oscillate with the radial distance. This oscillation pattern is independent of the operating frequencies (400 KHz, 2 MHz, and 3 MHz). As noted above, the sonde errors are due to conductive components in the tool, primarily the conductive mandrel. See U.S. Pat. Nos. 4,873,488 and 4,651,101 issued to Barber et al. The conductive mandrel creates a cylindrical boundary condition, which gives rise to the radial distance-dependent oscillation of the sonde errors.

Figure 18:
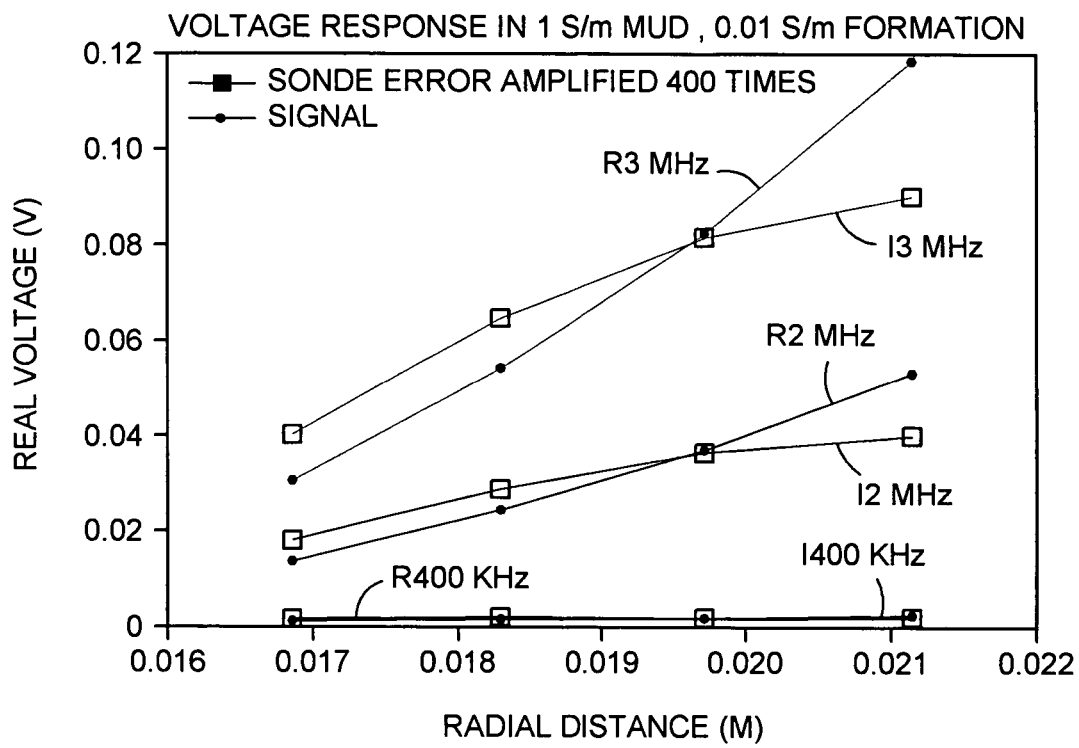
FIG. 18 shows a comparison of real signals and imaginary signals (amplified 400 times) as a function of radial distance of the array.

Because sonde errors oscillate with the radial distance, there might be an optimal radial location for the placement of the induction array. FIG. 18 shows the real signals detected by the receiver together with the sonde errors (amplified 400 times) at three different operating frequencies (400 KHz, 2 MHz, and 3 MHz) as a function of the radial distance. It is clear from FIG. 18 that the real signals increase faster than the sonde errors do as the radial distance increases. Therefore, it would be advantageous to place the induction array farther away from the mandrel. However, because the real signals are about 400 times stronger than the sonde errors, the influence of sonde errors is minimal no matter where the induction array is placed in the collar.

Figure 19A:
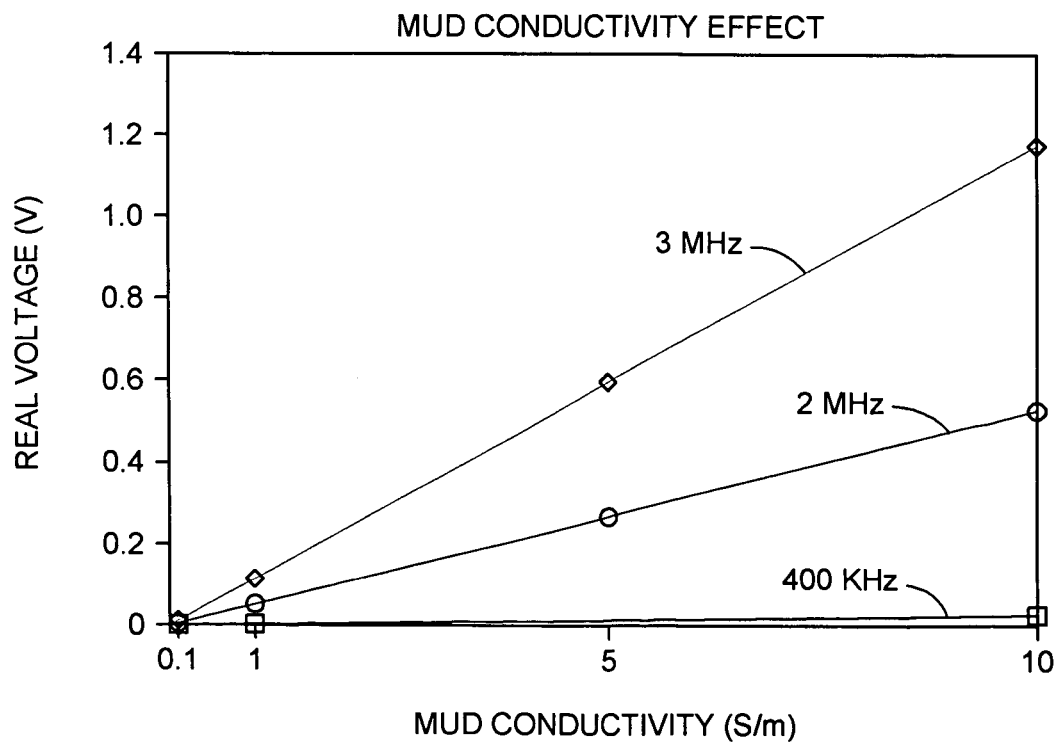
FIGS. 19A and 19B show the real and imaginary signals, respectively, of a sensor in accordance with one embodiment of the invention as a function of mud resistivity changes.
Figure 19B:
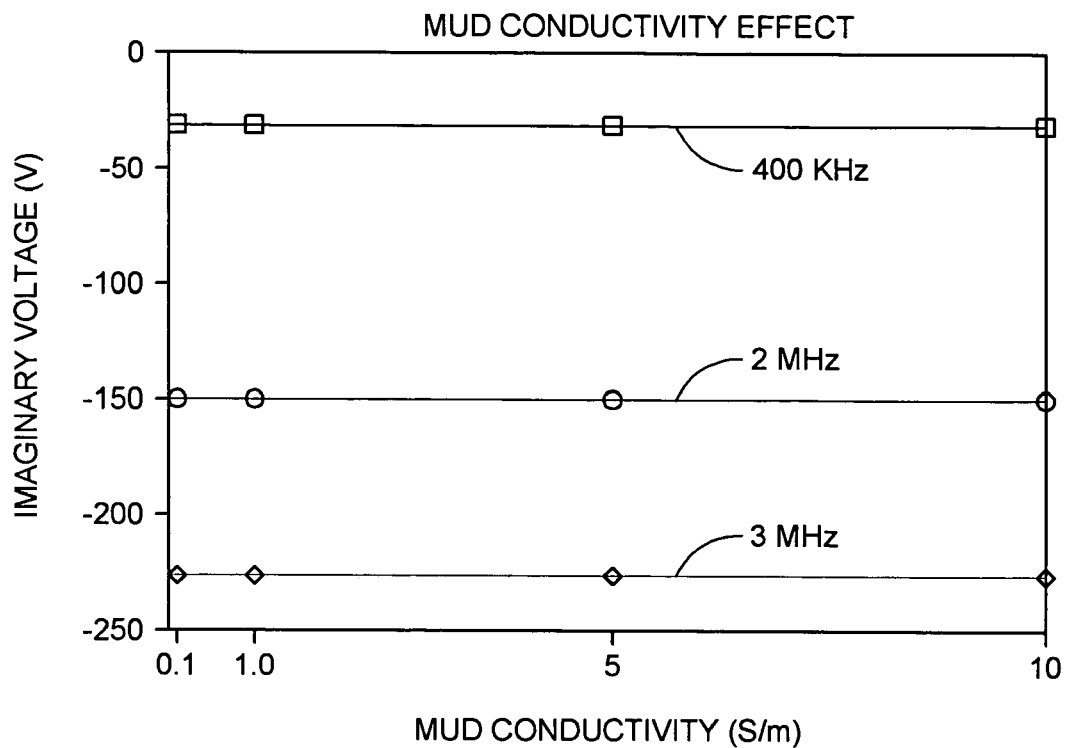
Figure 19C:
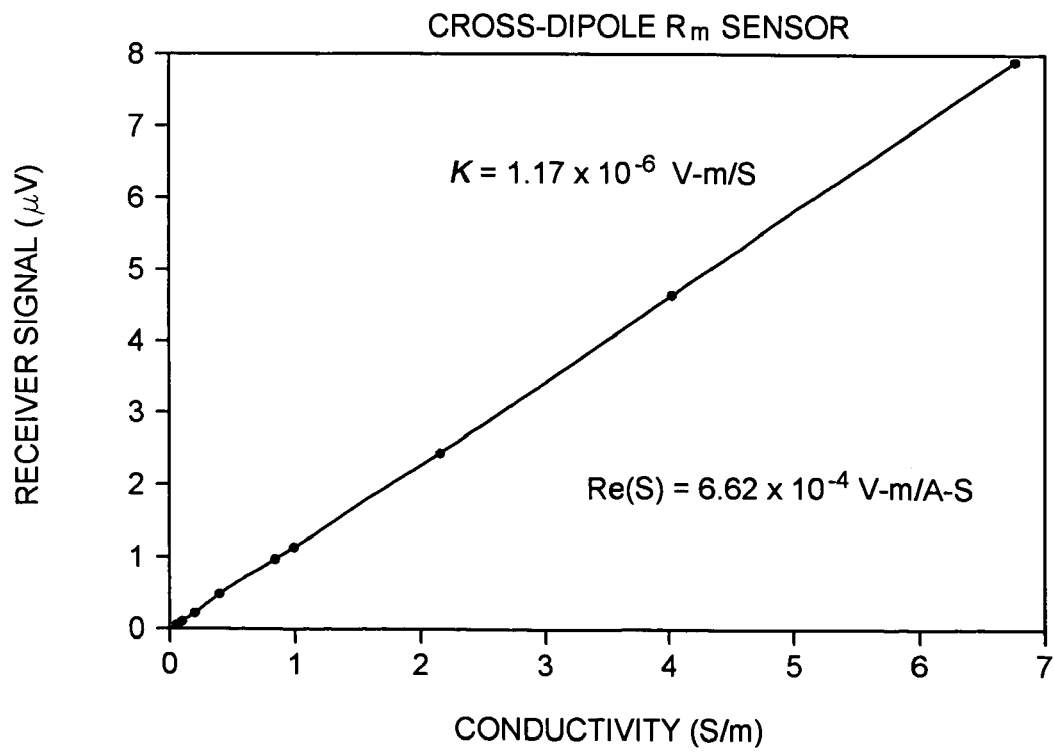
FIG. 19C shows a linear response curve of a mud sensor in accordance with one embodiment of the invention.

A good mud sensor should respond to the changes in mud resistivity in a linear fashion for $L<\delta$, where $\delta$ is the skin depth. As shown in FIG. 19A, the real signals detected by a cross dipole sensor of the invention responds to mud resistivity changes in a linear fashion, while FIG. 19B shows the imaginary signals, as expected, are not dependent on mud conductivities. The responses of the cross dipole sensor remains linear more than five orders of magnitude in mud conductivity. (see e.g., FIG. 19C).

FIG. 19A also shows that at a higher frequency (e.g., 3 MHz), the real signals are stronger, while FIG. 19B shows that the sonde errors (based on the imaginary signals) are smaller at the higher frequency. This phenomenon can be better illustrated with the ratio of the magnitudes of the real and imaginary signals. Table 1 shows a comparison of ratios of imaginary and real voltages (i.e., ratio=Im{voltage}/Re{voltage}) received by the receiver with different operating parameters. It is clear from this comparison that it is advantageous, though not required, to operate a mud sensor of the invention at higher frequencies.

TABLE 1

Comparison of Real/Imaginary Signal Ratios Under Different Conditions

|  | Mud Conductivity 1 S/m | Mud Conductivity 10 S/m |
| --- | --- | --- |
| High Frequency 10 MHz | 250 | 25 |
| Low Frequency 50 KHz | 50,000 | 5,000 |

Figure 20A:
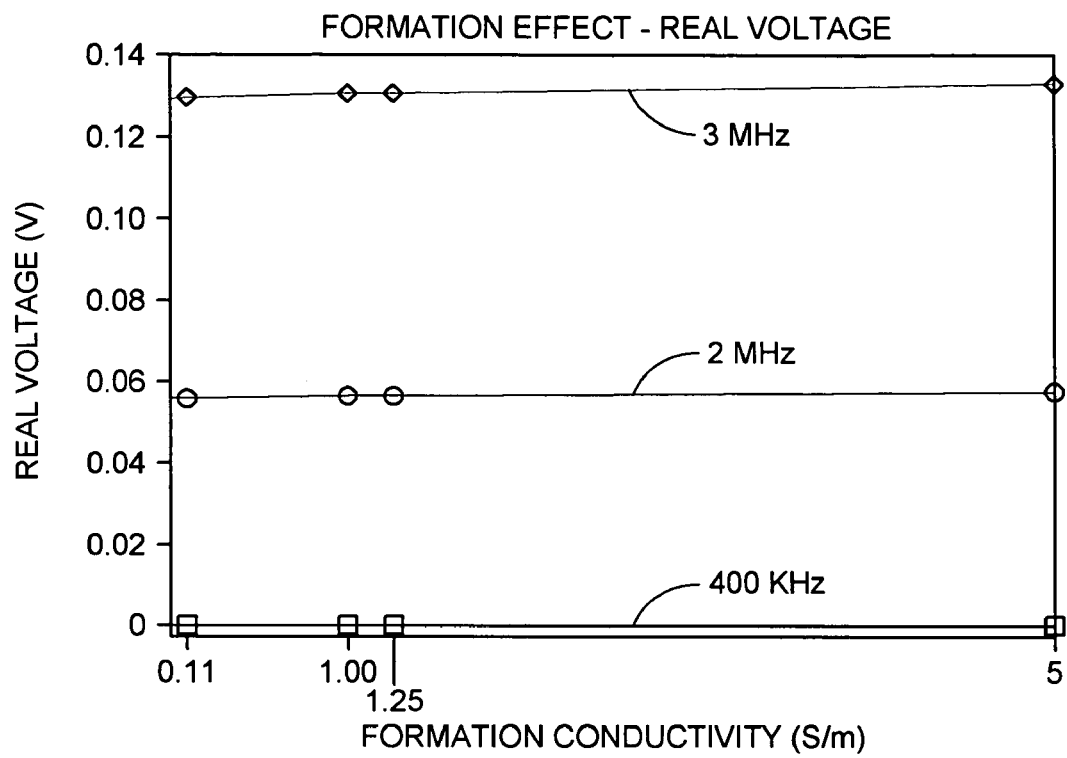
FIGS. 20A and 20B show the real and imaginary signals, respectively, of a sensor in accordance with one embodiment of the invention as a function of formation resistivity.
Figure 20B:
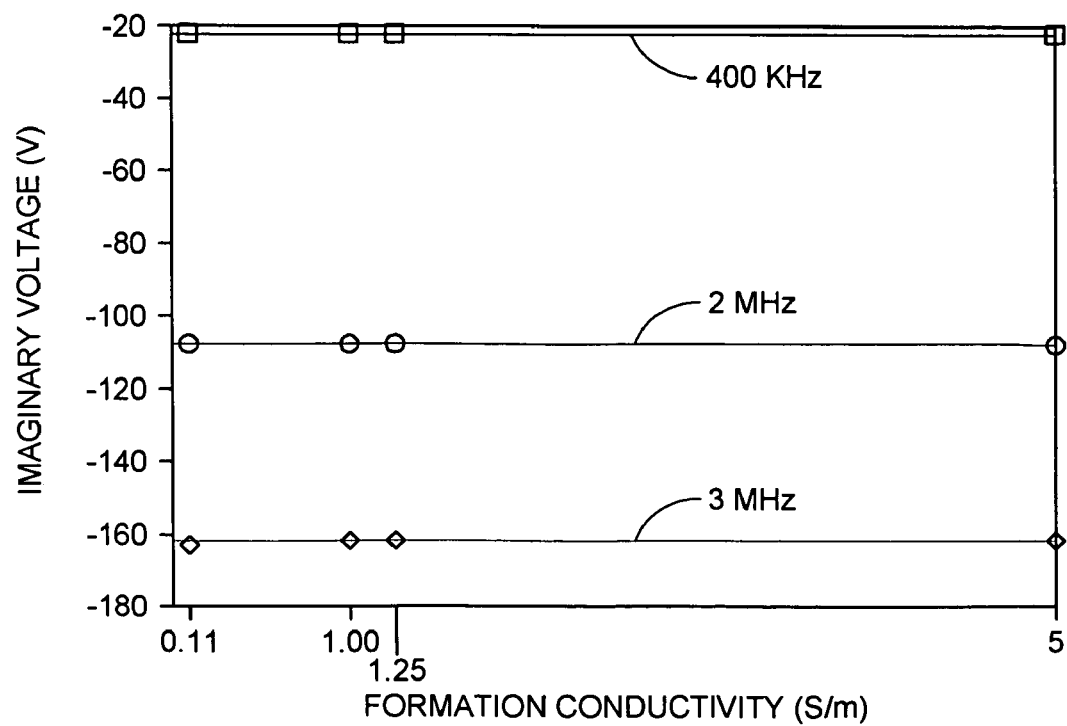
Figure 20C:
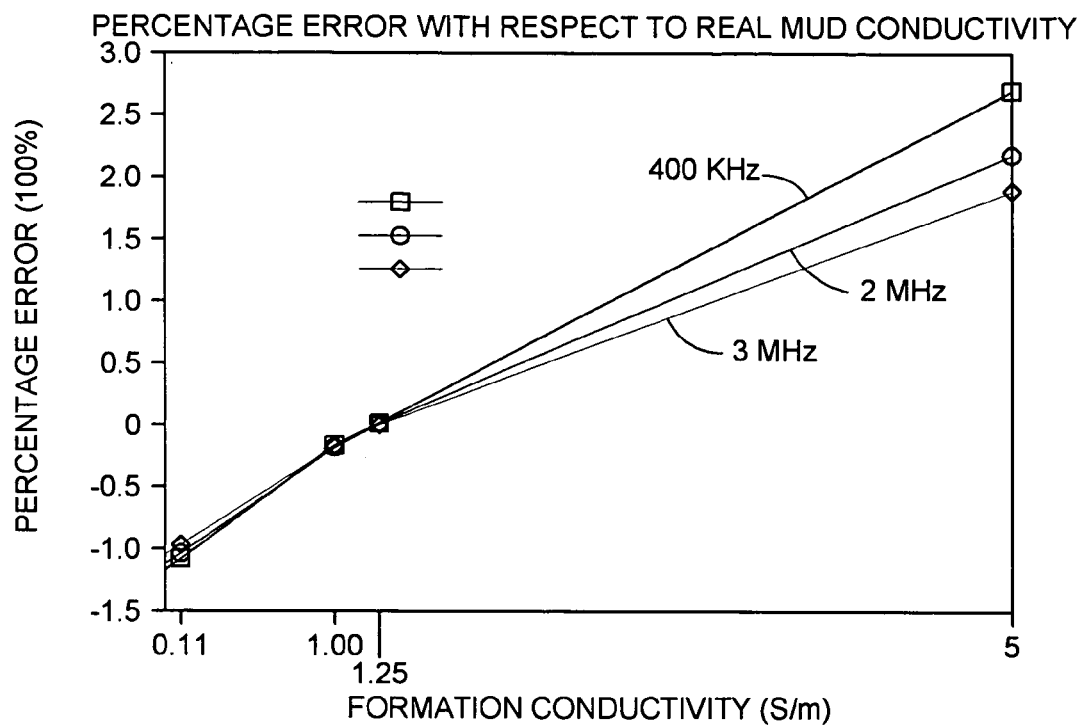
FIG. 20C shows the effect of formation conductivities on the accuracy of the mud resistivity determination.

A good mud sensor should be minimally affected by formation resistivity. The effects of formation resistivity on a cross dipole sensor in accordance with embodiments of the invention are shown in FIGS. 20A–20C. As shown in FIGS. 20A and 20B, a sensor of the invention is substantially non-responsive to changes in formation conductivities. However, this sensor is not completely immune from the formation conductivity changes. As shown in FIG. 20C, the percent errors of the real signals are dependent on the formation conductivities. However, these errors are relatively small, only a few percents. Furthermore, because logging tools are typically run with standoffs, such errors will be further minimized in field operations.

Embodiments of the invention described above are illustrated with one transmitter antenna and one receiver antenna. One of ordinary skill in the art would appreciate that a sensor of the invention need not be so limited. For example, a sensor of the invention may have two antennas arranged orthogonally (x and z directions) to each other at the transmitter location and/or two receiver antennas arranged orthogonally (x and z directions) to each other at the receiver location (see FIG. 3). The transmitter in the x direction ($T_x$) and the receiver in the z direction ($R_z$) form a cross dipole array ($T_x$-$R_z$), while the transmitter in the z direction ($T_z$) and the receiver in the x direction ($R_x$) form another cross dipole array ($T_z$-$R_x$). In addition, based on the principle of reciprocity, the transmitter and receiver functions may be reversed. Therefore, four cross dipole measurements are possible with the sensor of FIG. 3. These four measurements are from substantially the same volume of mud, and, therefore, they should be essentially identical. Accordingly, any of these four cross dipole arrays may provide sufficient information for deriving the mud resistivity.

The tool configuration shown in FIG. 3 can also provide a longitudinal array ($T_z$-$R_z$) and a transverse array ($T_x$-$R_x$). As noted above, these non-cross dipole arrays are sensitive to borehole size changes and tool eccentering. They may not provide robust mud conductivities under all conditions. Nevertheless, these arrays may be used to monitor measurement conditions, and, therefore, they may find use in further refining the measurements made with the cross dipole arrays.

By the same token, the transmitter or receiver "complex" may comprise more than two antennas. For example, each of the transmitter and the receiver complexes may comprise a triaxial antenna, which may have three antennas arranged orthogonal to one another. A total of nine arrays are possible with a triaxial-triaxial arrangement. In addition, any of the transmitter or receiver antenna may comprise a tilted antenna.

When the transmitter and receiver complexes comprise multiple antennas, it is possible to operate each antenna sequentially so that the signals received are temporally distinct (time multiplexing). Alternatively, multiple antennas may be operated simultaneously and the signals received are differentiated based on different frequencies (frequency multiplexing). It is also possible to mix the time-multiplexing and frequency-multiplexing in a single operation.

Figure 21:
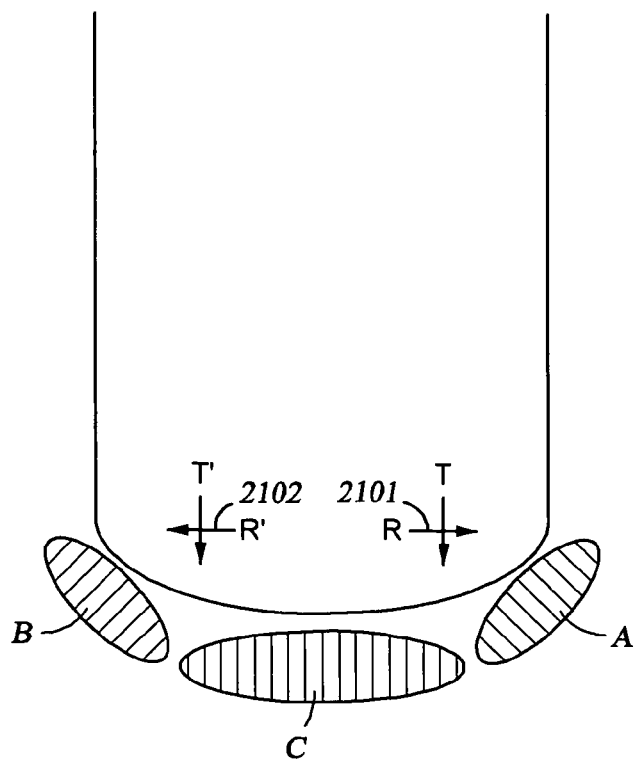
FIG. 21 shows an alternate configuration of a sensor in accordance with one embodiment of the invention.

The mud sensors described above are located in the insulating collar of a downhole tool and, therefore, need not be used as the bottommost section of the tool. That is, they can be used in a "through-wire" configuration. Some embodiments of the invention may have these sensors located at the bottom of a downhole tool, as shown in FIG. 21. These sensors can measure the mud resistivity in the vicinity of the bottom of the well.

Furthermore, when the mud resistivity sensor is located at the lowermost section of the tool or drill string, more than one sensor may be used to provide mud resistivity measurements. For example, FIG. 21 shows two mud sensors 2101 and 2102 disposed substantially symmetrically across the longitudinal axis of the tool. Mud sensor 2101 comprises a transmitter T and a receiver R, having their magnetic moments substantially in orthogonal directions. Similarly, mud sensor 2102 comprises a transmitter T' and a receiver R' arranged in substantially orthogonal directions. Note that the designations of transmitters and receivers are for clarity of description. One of ordinary skill in the art would appreciate that these coils have the same physical properties and can be used as either a transmitter or a receiver depending on the application. Therefore, the references to a transmitter or a receiver in embodiments of the invention may include the reverse.

The mud sensor 2101 will be most sensitive to region A in front of the sensor 2101, while the mud sensor 2102 will be most sensitive to region B in front of the sensor 2102. In addition, the transmitter T in mud sensor 2101 may be operated in conjunction with the receiver R' in mud sensor 2102, or the transmitter T' of mud sensor 2102 may be operated in conjunction with the receiver R of mud sensor 2101. In this case, the sensitive region will be in between the mud sensors 2101 and 2102, i.e., region C.

Figure 22:
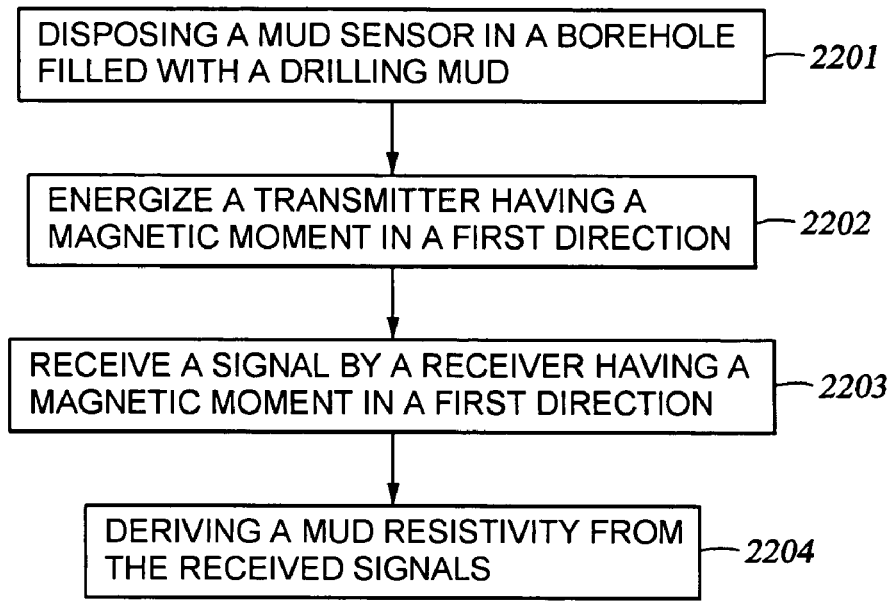
FIG. 22 shows a method for measuring mud resistivity in accordance with one embodiment of the invention.

FIG. 22 shows a method for mud resistivity measurement in accordance with one embodiment of the invention. A mud sensor in accordance with embodiments of the invention may be lowered into a wellbore filled with a drilling mud (step 2201). As noted above, the sensor may be part of a downhole tool, which may be a wireline tool or an LWD tool.

When measurements of mud resistivity is desired, the transmitter antenna is energized by passing an alternate current through it (step 2202). The transmitter antenna has a magnetic moment in a first orientation (e.g., x or z direction). Then, the signal induced in the receiver is measured (step 2203). The receiver has a magnetic moment in a second direction, which is substantially different from the first direction. In a preferred embodiments, the first direction and the second direction are substantially orthogonal to each other. Furthermore, the receiver is typically spaced apart from the transmitter by a distance of several inches or less, e.g., no more than 10 inches. In preferred embodiments, the spacing is no more than 5 inches, and more preferably no more than 2 inches. The shorter spacing ensures that the measurements are less impacted by formation conductivities and/or borehole effects.

The signals measured by the receiver is then used to derive mud resistivity (step 2204). Various approach may be used to derive the mud resistivity from the voltage measurements. For example, the sensor may be pre-calibrated with known mud resistivities to construct a lookup table. Then, the measurement data are compared with the lookup table. Alternatively, the property of the array may be derived from known physical characteristics of the sensor. For example, the following equation describes the voltage response at a unit receiver:

$$V = \frac{\partial}{\partial t} \int \vec{B} d\vec{A} = -i\omega B = k_{const}\sigma + ATT \qquad (1)$$

where σ is the conductivity of the volume measured, $k_{const}$ is a constant of the array, and ATT is an attenuation factor and is expected to be small. The array constant $k_{const}$ relates to physical properties of the array, including the array spacing, the number of turns of the coils, the areas of the coils, etc.

Note that sensors in accordance with embodiments of the invention may be used in a wireline or an LWD tool. In addition, a sensor of the invention may also include a bucking coil. Bucking coils eliminate or reduce mutual couplings between transmitters and receivers. The use of bucking coils is well known in the art. A bucking coil is typically wound in an opposite direction to the direction of the winding of the corresponding receiver coil. The number of turns and the location of the bucking coil should be judicially selected to optimize its function.

Figure 23:
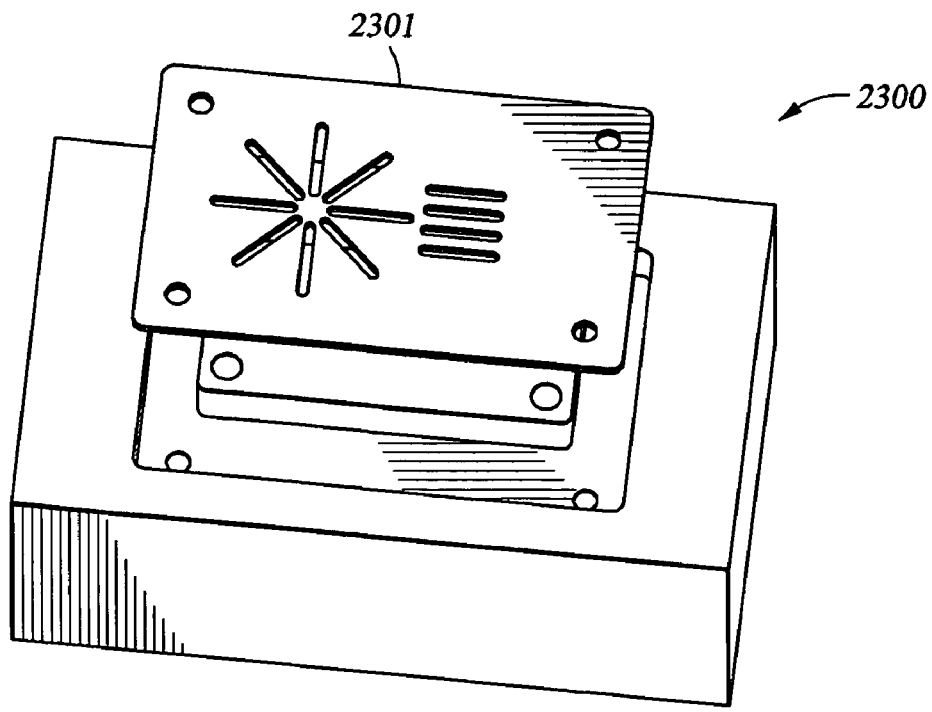
FIG. 23 shows a modular sensor design with a metal shield in accordance with one embodiment of the invention.

The coils in the transmitters and receivers may comprise solenoids or loop antennas. In a typical embodiment, the transmitter and the receiver are arranged in a cavity in the insulating collar so that the magnetic moments are in the desired orientations. The relatively small dimension of the arrays makes it convenient to manufacture the arrays as modules, which will facilitate repair and replacement. The cavity is then filled with an insulating material (e.g., PEEK, ceramic, rubber, etc.). The outside surface of the cavity may then be protected with a hard material, such as metal. If a conductive material is used as a protective shield, proper slots should be included in the shield to permit the magnetic fields to be induced in the mud. The use of slotted metal shields for induction coils is known in the art. See e.g., U.S. Pat. No. 6,297,639 issued to Clark et al. FIG. 23 shows one example of a mud sensor design in accordance with one embodiment of the invention. As shown, a modular design of mud sensor 2300 includes a metal shield 2301 having proper slots cut in front of the antennas (not shown) to permit transmission of electromagnetic energy.

The small size (on the order of 1 inch) of an array of these sensors also makes it convenient to construct the transmitter coils and/or the receiver coils on a printed circuit board (PCB). For example, a loop antenna may be printed on a PCB using techniques that are used to produce circuitries. Different antennas, either on the same PCB or different PCBs, may then be arranged in a cavity in the insulating collar to produce magnetic moments in the desired orientations (e.g., x or z). Examples of such antennas may be found in U.S. Pat. No. 6,690,170 B2 issued to Homan et al. and U.S. Patent Application Publication No. 2003/0184304 A1 by Homan et al. This patent and the published application are assigned to the present assignee and are incorporated by reference in their entirety. One of ordinary skill in the art would appreciate that other modifications are possible without departing from the scope of the invention.

Advantages of the invention may include the following. Embodiments of the invention use induction arrays to measure mud resistivity. The antennas of the induction array need not be in contact with the mud in the borehole. The entire array may be enclosed in an insulating collar. There is no need to use O-rings to seal the antennas to protect them against the harsh environments downhole. Therefore, a sensor of the invention may be used at high pressure and/or high temperature found in deep holes. Embodiments of the invention may be used in a through-wire configuration; they need not be attached as the bottommost section of the tool. A mud sensor in accordance with embodiments of the invention can provide accurate mud resistivity measurements, because the sensor is less influenced by the formation resistivity, borehole size, and tool standoff. A sensor of the invention may be used on a wireline or an LWD tool.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A sensor for measuring mud resistivity in a borehole, comprising:

a transmitter having a magnetic moment in a first direction; and a receiver having a magnetic moment in a second direction, wherein the first direction and the second direction are substantially different, wherein the transmitter and the receiver are disposed in an insulating collar of a downhole tool, and wherein the transmitter is disposed at a selected distance no more than 10 inches from the receiver along a longitudinal axis of the downhole tool.

2. The sensor of claim 1, wherein the first direction is substantially orthogonal to the second direction.

3. The sensor of claim 1, wherein at least one of the transmitter and receiver is on a printed circuit board.

4. The sensor of claim 1, wherein the selected distance is no more than 5 inches.

5. The sensor of claim 1, wherein the selected distance is no more than 2 inches.

6. The sensor of claim 1, wherein the selected distance is about 1 inch.

7. The sensor of claim 1, wherein one of the first direction and the second direction is substantially perpendicular to the longitudinal axis of the downhole tool.

8. The sensor of claim 1, wherein one of the first direction and the second direction is substantially parallel to the longitudinal axis of the downhole tool.

9. The sensor of claim 1, wherein at least one antenna of the transmitter and the receiver comprises a tilted antenna.

10. The sensor of claim 1, wherein the transmitter and the receiver are in a module configured to be placed in a cavity in the insulating collar of the downhole tool.

11. The sensor of claim 1, wherein the downhole tool is one selected from a wireline tool, measurement-while-drilling tool, logging-while-tripping tool, and a logging-while-drilling tool.

12. A sensor for measuring mud resistivity in a borehole, comprising:

a transmitter having a magnetic moment in a first direction; and a receiver having a magnetic moment in a second direction, wherein the first direction and the second direction are substantially different, wherein the transmitter and the receiver are disposed in an insulating collar of a downhole tool, and wherein the transmitter and the receiver, when projected onto a plane substantially perpendicular to a longitudinal axis of the downhole tool, are separated from each other by an azimuthal angle of less than 90 degrees.

13. The sensor of claim 12, wherein the azimuthal angle is no more than 45 degrees.

14. The sensor of claim 12, wherein the azimuthal angle is no more than 30 degrees.

15. The sensor of claim 12, wherein the first direction is substantially orthogonal to the second direction.

16. The sensor of claim 12, wherein at least one antenna of the transmitter and the receiver comprises a tilted antenna.

17. The sensor of claim 12, wherein at least one of the transmitter and receiver is on a printed circuit board.

18. The sensor of claim 12, wherein one of the first direction and the second direction is substantially perpendicular to the longitudinal axis of the downhole tool.

19. The sensor of claim 12, wherein one of the first direction and the second direction is substantially parallel to the longitudinal axis of the downhole tool.

20. The sensor of claim 12, wherein the transmitter and the receiver are in a module configured to be placed in a cavity in the insulating collar of the downhole tool.

21. The sensor of claim 12, wherein the downhole tool is one selected from a wireline tool, measurement-while-drilling tool, logging-while-tripping tool, and a logging-while-drilling tool.

22. A downhole tool comprising a mud resistivity sensor disposed in an insulating portion of the downhole tool, wherein the mud resistivity sensor comprises:

a transmitter having a magnetic moment in a first direction; and a receiver having a magnetic moment in a second direction, wherein the first direction and the second direction are substantially different, wherein the transmitter is disposed at a selected distance no more than 10 inches from the receiver along a longitudinal axis of the downhole tool.

23. A downhole tool comprising at least one mud resistivity sensor disposed in an insulating portion of a lowermost section of the downhole tool, wherein the mud resistivity sensor comprises:

a transmitter having a magnetic moment in a first direction; and a receiver having a magnetic moment in a second direction, wherein the first direction and the second direction are substantially different, and wherein the transmitter is disposed at a selected distance no more than 10 inches from the receiver along a longitudinal axis of the downhole tool.

24. The downhole tool of claim 23, wherein the at least one mud resistivity sensor comprises two mud resistivity sensors, wherein the two mud resistivity sensors are disposed at a substantially identical location along a longitudinal axis of the downhole tool.

25. A method for measuring mud resistivity in a wellbore, comprising:

energizing a transmitter to induce a magnetic field, wherein the transmitter has a magnetic moment in a first direction;

acquiring a voltage measurement using a receiver at a selected location, wherein the receiver has a magnetic moment in a second direction that is substantially different from the first direction, and wherein the selected location is no more than 10 inches away from the transmitter; and deriving a mud conductivity from the voltage measurement.

26. The method of claim 25, wherein the transmitter is energized by passing an alternate current having a frequency of at least 400 KHz.

27. The method of claim 25, wherein the selected location is no more than 5 inches from the transmitter.

28. The method of claim 25, wherein the selected location is no more than 2 inches from the transmitter.

29. The method of claim 25, wherein the first direction is substantially orthogonal to the second direction.

* * * * *